United States Patent
Li et al.

(10) Patent No.: US 10,057,924 B2
(45) Date of Patent: Aug. 21, 2018

(54) HIGH EFFICIENCY SIGNAL FIELD IN HIGH EFFICIENCY WIRELESS LOCAL AREA NETWORK

(71) Applicant: Intel IP Corporation, Santa Clara, CA (US)

(72) Inventors: Qinghua Li, San Ramon, CA (US); Xiaogang Chen, Beijing (CN); Yuan Zhu, Beijing (CN); Huaning Niu, Milpitas, CA (US); Hujun Yin, Saratoga, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 40 days.

(21) Appl. No.: 14/998,291

(22) Filed: Dec. 24, 2015

(65) Prior Publication Data

US 2016/0353322 A1   Dec. 1, 2016

Related U.S. Application Data

(60) Provisional application No. 62/167,088, filed on May 27, 2015.

(51) Int. Cl.
| | |
|---|---|
| *H04W 74/00* | (2009.01) |
| *H04W 84/12* | (2009.01) |
| *H04L 5/00* | (2006.01) |

(52) U.S. Cl.
CPC ............ *H04W 74/004* (2013.01); *H04L 5/00* (2013.01); *H04W 84/12* (2013.01)

(58) Field of Classification Search
CPC .. H04B 7/0452; H04B 7/0413; H04B 7/2656; H04L 5/00; H04L 69/22; H04L 74/00;
(Continued)

(56) References Cited

U.S. PATENT DOCUMENTS

| | | | | |
|---|---|---|---|---|
| 7,203,183 | B2 * | 4/2007 | Cromer | H04W 28/08 370/338 |
| 7,290,057 | B2 * | 10/2007 | Saunders | H04L 29/06 375/E7.01 |

(Continued)

FOREIGN PATENT DOCUMENTS

| | | | | |
|---|---|---|---|---|
| CN | 105723780 A | * | 6/2016 | .......... H04L 67/104 |
| EP | 3139532 A1 | * | 3/2017 | .......... H04L 5/0023 |

(Continued)

*Primary Examiner* — Michael Thier
*Assistant Examiner* — Eric Nowlin
(74) *Attorney, Agent, or Firm* — Eversheds Sutherland (US) LLP

(57) ABSTRACT

This disclosure describes methods, apparatus, and systems related to a high efficiency SIGNAL field in high efficiency wireless LAN access network. A device may determine at least one communication channel with one or more devices including a first device and a second device. The device may generate a high efficiency preamble in accordance with a high efficiency communication standard, the high efficiency preamble including, at least in part, a first high efficiency SIGNAL field and a second high efficiency SIGNAL field. The device may partition the second high efficiency SIGNAL fields into, at least in part, a common subfield, and one or more device specific subfields. The device may send the high efficiency preamble to at least one of the one or more devices.

17 Claims, 10 Drawing Sheets

(58) Field of Classification Search
CPC . H04L 5/0007; H04L 41/0896; H04L 67/104;
H04L 67/1053; H04W 16/10; H04W
72/042; H04W 72/0446; H04W 72/0453;
H04W 84/12; H04W 28/22; H04W 52/02;
H04W 52/0225; H04W 52/0229; H04W
52/0235; H04W 74/002; H04W 74/004;
H04W 76/046; H04W 88/04; H04W
92/18; Y02B 60/50
See application file for complete search history.

(56) References Cited

U.S. PATENT DOCUMENTS

| | | | | |
|---|---|---|---|---|
| 7,450,489 B2* | 11/2008 | Sandhu | | H04L 5/0048 370/204 |
| 7,577,714 B2* | 8/2009 | Saunders | | H04L 29/06 709/213 |
| 8,116,245 B2* | 2/2012 | Kwon | | H04W 52/0238 370/311 |
| 8,307,231 B2* | 11/2012 | Radulescu | | H04M 1/7253 340/539.13 |
| 8,498,245 B2* | 7/2013 | Wu | | H04W 28/06 370/328 |
| 8,625,690 B2* | 1/2014 | Taghavi Nasrabadi | | H04L 5/0023 341/173 |
| 8,675,688 B2* | 3/2014 | Oh | | H04W 52/0235 370/509 |
| 8,767,873 B2* | 7/2014 | Baik | | H04L 5/00 375/299 |
| 8,923,432 B2* | 12/2014 | Baik | | H04L 5/00 375/295 |
| 8,948,283 B2* | 2/2015 | Zhang | | H04L 5/0048 375/260 |
| 8,982,889 B2* | 3/2015 | Zhang | | H04L 1/0025 370/349 |
| 9,094,175 B2* | 7/2015 | Abraham | | H04L 1/0061 |
| 9,154,979 B2* | 10/2015 | Asokan | | H04W 24/06 |
| 9,209,872 B2* | 12/2015 | Stacey | | H04B 7/0452 |
| 9,215,055 B2* | 12/2015 | Chu | | H04L 5/0037 |
| 9,282,552 B1* | 3/2016 | Dunsbergen | | H04W 48/12 |
| 9,288,752 B2* | 3/2016 | Panta | | H04W 52/0203 |
| 9,386,610 B2* | 7/2016 | Dunsbergen | | H04W 48/12 |
| 9,485,733 B1* | 11/2016 | Park | | H04W 52/0235 |
| 9,497,744 B2* | 11/2016 | Husen | | H04W 72/042 |
| 9,667,465 B2* | 5/2017 | Taghavi Nasrabadi | | H04L 5/0023 |
| 9,685,999 B2* | 6/2017 | Seok | | H04L 27/2602 |
| 9,706,546 B2* | 7/2017 | Zhang | | H04L 1/0025 |
| 9,736,870 B1* | 8/2017 | Dunsbergen | | H04W 48/12 |
| 9,820,226 B2* | 11/2017 | Thomson | | H04W 52/0216 |
| 9,843,654 B2* | 12/2017 | Vermani | | H04L 69/18 |
| 9,860,037 B2* | 1/2018 | Van Zelst | | H04L 5/003 |
| 9,876,614 B1* | 1/2018 | Sun | | H04L 1/1812 |
| 9,882,695 B2* | 1/2018 | Azizi | | H04L 5/0053 |
| 2004/0001467 A1* | 1/2004 | Cromer | | H04W 28/04 370/338 |
| 2004/0039834 A1* | 2/2004 | Saunders | | H04L 29/06 709/231 |
| 2005/0046700 A1* | 3/2005 | Bracke | | H04N 13/0029 348/218.1 |
| 2006/0288113 A1* | 12/2006 | Saunders | | H04L 29/06 709/231 |
| 2007/0245207 A1* | 10/2007 | Ji | | H03M 13/2957 714/755 |
| 2010/0150042 A1* | 6/2010 | Oh | | H04W 52/0235 370/311 |
| 2011/0280232 A1* | 11/2011 | Wu | | H04W 28/06 370/338 |
| 2011/0280326 A1* | 11/2011 | Tu | | H04B 7/0413 375/260 |
| 2012/0020261 A1* | 1/2012 | Van Zelst | | H04L 5/003 370/310 |
| 2012/0182980 A1* | 7/2012 | Abraham | | H04L 1/0061 370/338 |
| 2012/0213305 A1* | 8/2012 | Oh | | H04L 1/0083 375/267 |
| 2012/0236971 A1* | 9/2012 | Taghavi Nasrabadi | | H04L 5/0023 375/340 |
| 2012/0294294 A1* | 11/2012 | Zhang | | H04L 1/0025 370/338 |
| 2013/0142275 A1* | 6/2013 | Baik | | H04L 5/00 375/295 |
| 2013/0142276 A1* | 6/2013 | Baik | | H04L 5/00 375/295 |
| 2013/0155867 A1* | 6/2013 | Asokan | | H04W 24/06 370/241 |
| 2014/0051476 A1* | 2/2014 | Chawla | | H04W 52/0209 455/552.1 |
| 2014/0169245 A1* | 6/2014 | Kenney | | H04L 27/2613 370/311 |
| 2014/0307650 A1* | 10/2014 | Vermani | | H04L 5/0044 370/329 |
| 2015/0063258 A1* | 3/2015 | Merlin | | H04L 47/12 370/329 |
| 2015/0103707 A1* | 4/2015 | Panta | | H04W 52/0203 370/311 |
| 2015/0146808 A1* | 5/2015 | Chu | | H04L 5/0037 375/260 |
| 2015/0163028 A1* | 6/2015 | Tandra | | H04L 5/0037 370/203 |
| 2015/0189639 A1* | 7/2015 | Zhang | | H04L 1/0025 370/330 |
| 2015/0381399 A1* | 12/2015 | Taghavi Nasrabadi | | H04L 5/0023 375/340 |
| 2016/0021612 A1* | 1/2016 | Matsunaga | | H04W 74/0816 370/311 |
| 2016/0066338 A1* | 3/2016 | Kwon | | H04L 5/0007 370/330 |
| 2016/0081087 A1* | 3/2016 | Kwon | | H04W 72/0446 370/329 |
| 2016/0119888 A1* | 4/2016 | Kawamoto | | H04W 56/001 370/350 |
| 2016/0128105 A1* | 5/2016 | Dunsbergen | | H04W 48/12 370/329 |
| 2016/0150505 A1* | 5/2016 | Hedayat | | H04L 69/22 370/329 |
| 2016/0150514 A1* | 5/2016 | Kwon | | H04W 74/0816 370/329 |
| 2016/0174200 A1* | 6/2016 | Seok | | H04W 72/04 370/329 |
| 2016/0198422 A1* | 7/2016 | Panta | | H04W 52/0203 370/311 |
| 2016/0212001 A1* | 7/2016 | Azizi | | H04L 27/2613 |
| 2016/0295511 A1* | 10/2016 | Qi | | H04L 67/104 |
| 2016/0295587 A1* | 10/2016 | Kwon | | H04W 72/0446 |
| 2016/0329989 A1* | 11/2016 | Li | | H04L 1/0061 |
| 2016/0329999 A1* | 11/2016 | Li | | H04L 5/0007 |
| 2016/0330300 A1* | 11/2016 | Josiam | | H04L 69/22 |
| 2016/0330715 A1* | 11/2016 | Chen | | H04L 27/2607 |
| 2016/0330718 A1* | 11/2016 | Kim | | H04L 5/0091 |
| 2016/0374018 A1* | 12/2016 | Min | | H04W 52/0229 |
| 2016/0380731 A1* | 12/2016 | Kim | | H04L 5/0007 370/329 |
| 2017/0013506 A1* | 1/2017 | Chen | | H04L 1/00 |
| 2017/0041929 A1* | 2/2017 | Noh | | H04L 5/0053 |
| 2017/0047971 A1* | 2/2017 | Seok | | H04L 27/2602 |
| 2017/0048844 A1* | 2/2017 | Chen | | H04W 72/0413 |
| 2017/0063588 A1* | 3/2017 | Sun | | H04L 5/0025 |
| 2017/0064718 A1* | 3/2017 | Bharadwaj | | H04W 72/0493 |
| 2017/0070998 A1* | 3/2017 | Wu | | H04L 5/0023 |
| 2017/0093546 A1* | 3/2017 | Wu | | H04L 5/0037 |
| 2017/0111154 A1* | 4/2017 | Azizi | | H04L 5/0053 |
| 2017/0118676 A1* | 4/2017 | Li | | H04W 28/06 |
| 2017/0163394 A1* | 6/2017 | Choi | | H04L 5/0048 |
| 2017/0181129 A1* | 6/2017 | Bharadwaj | | H04B 7/0452 |
| 2017/0181130 A1* | 6/2017 | Bharadwaj | | H04B 7/0452 |
| 2017/0201906 A1* | 7/2017 | Liu | | H04W 28/065 |

(56) References Cited

U.S. PATENT DOCUMENTS

| | | | |
|---|---|---|---|
| 2017/0222769 A1* | 8/2017 | Li | H04L 1/206 |
| 2017/0280462 A1* | 9/2017 | Chun | H04W 72/082 |
| 2017/0280498 A1* | 9/2017 | Min | H04L 5/0007 |
| 2017/0295561 A1* | 10/2017 | Kim | H04W 72/04 |
| 2017/0347385 A1* | 11/2017 | Dunsbergen | H04W 48/12 |
| 2017/0359812 A1* | 12/2017 | Park | H04W 72/0406 |
| 2017/0367090 A1* | 12/2017 | Lim | H04W 72/0426 |
| 2017/0373806 A1* | 12/2017 | Choi | H04L 5/005 |
| 2018/0020410 A1* | 1/2018 | Park | H04W 52/0235 |

FOREIGN PATENT DOCUMENTS

| | | | | |
|---|---|---|---|---|
| WO | WO-2015094446 A1 * | 6/2015 | | H04L 67/104 |
| WO | WO-2016039990 A1 * | 3/2016 | | H04W 2/0446 |

* cited by examiner

HIGH EFFICIENCY SIGNAL FIELD IN HIGH EFFICIENCY WIRELESS LOCAL AREA NETWORK

CROSS-REFERENCE TO RELATED APPLICATIONS

This application claims the benefit of U.S. Provisional Application No. 62/167,088 filed May 27, 2015 the disclosure of which is incorporated herein by reference as if set forth in full.

TECHNICAL FIELD

This disclosure generally relates to systems and methods for wireless communications and, more particularly, to a high efficiency SIGNAL field in a high efficiency wireless local area network access network.

BACKGROUND

Under development is a new IEEE 802.11ax standard, known as high efficiency wireless local area network (HEW) that is aimed to enhance Wi-Fi performance in indoor and outdoor scenarios. New HEW features are introduced to improve the spectral efficiency and user-throughputs of Wi-Fi in dense deployments. These may involve changes to the physical (PHY) and medium access control (MAC) layers.

DETAILED DESCRIPTION

Example embodiments described herein provide certain systems, methods, and devices, for providing signaling information to Wi-Fi devices in various Wi-Fi networks, including, but not limited to, IEEE 802.11ax (referred to as HE or HEW).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

During communication between two devices, one or more frames may be sent and received. These frames may include one or more fields that may be based on an IEEE 802.11 standard. In a high efficiency communication (e.g., HEW) these one or more fields may be represented by one or more OFDMA symbols. The format of an HEW preamble may include multiple OFDM symbols that may be represented by one or more fields, for example, some fields may be legacy fields, and some fields may be high efficiency fields. The legacy fields may be fields that allow compatibility with non-HEW devices. The high efficiency fields may allow HEW specific information to be exchanged between, for example, an AP and one or more user devices that may be HEW devices. One of these high efficiency fields may be a high efficiency SIGNAL B (HE-SIG-B) field.

Example embodiments of the present disclosure relate to systems, methods, and devices for a high efficiency SIGNAL field system that allows the HE-SIG-B to be divided in one or more parts before transmission to one or more user devices that may be serviced by an AP. The division of the HE-SIG-B field may allow for overhead reduction, data reception, and interference reduction.

Figure 1:
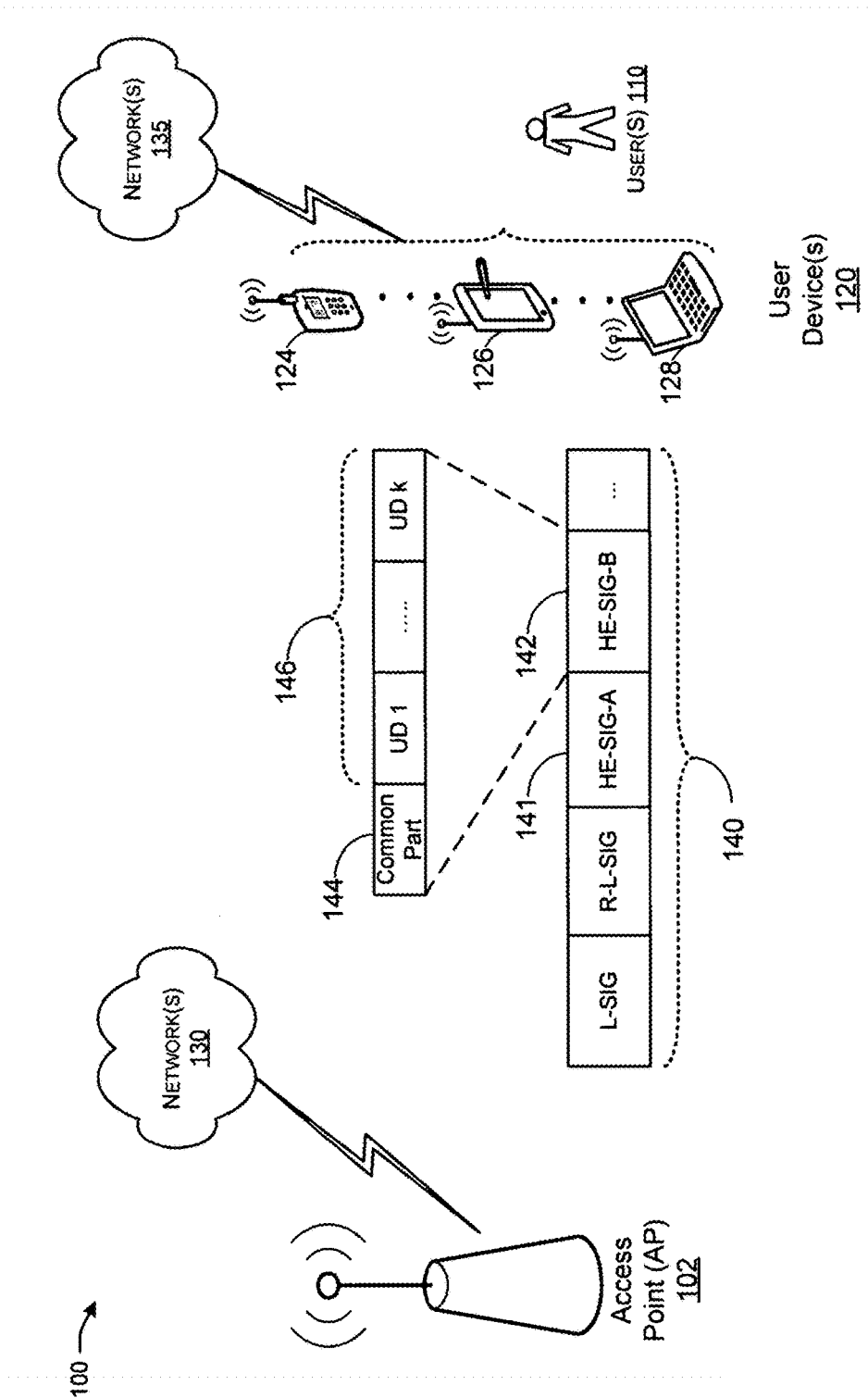
FIG. 1 depicts a network diagram illustrating an example network environment of an illustrative high efficiency SIGNAL field architecture, in accordance with the one or more embodiments of the disclosure.

FIG. 1 is a network diagram illustrating an example wireless network 100, according to some example embodiments of the present disclosure. Wireless network 100 can include one or more user devices 120 (e.g., 124, 126, or 128), and AP 102, which may communicate in accordance with wireless standards, such as, IEEE 802.11 communication standards, including IEEE 802.11ax (HEW). The user device(s) 120 and the one or more AP 102 may be devices that are non-stationary without fixed locations or may be stationary with fixed locations.

Figure 8:
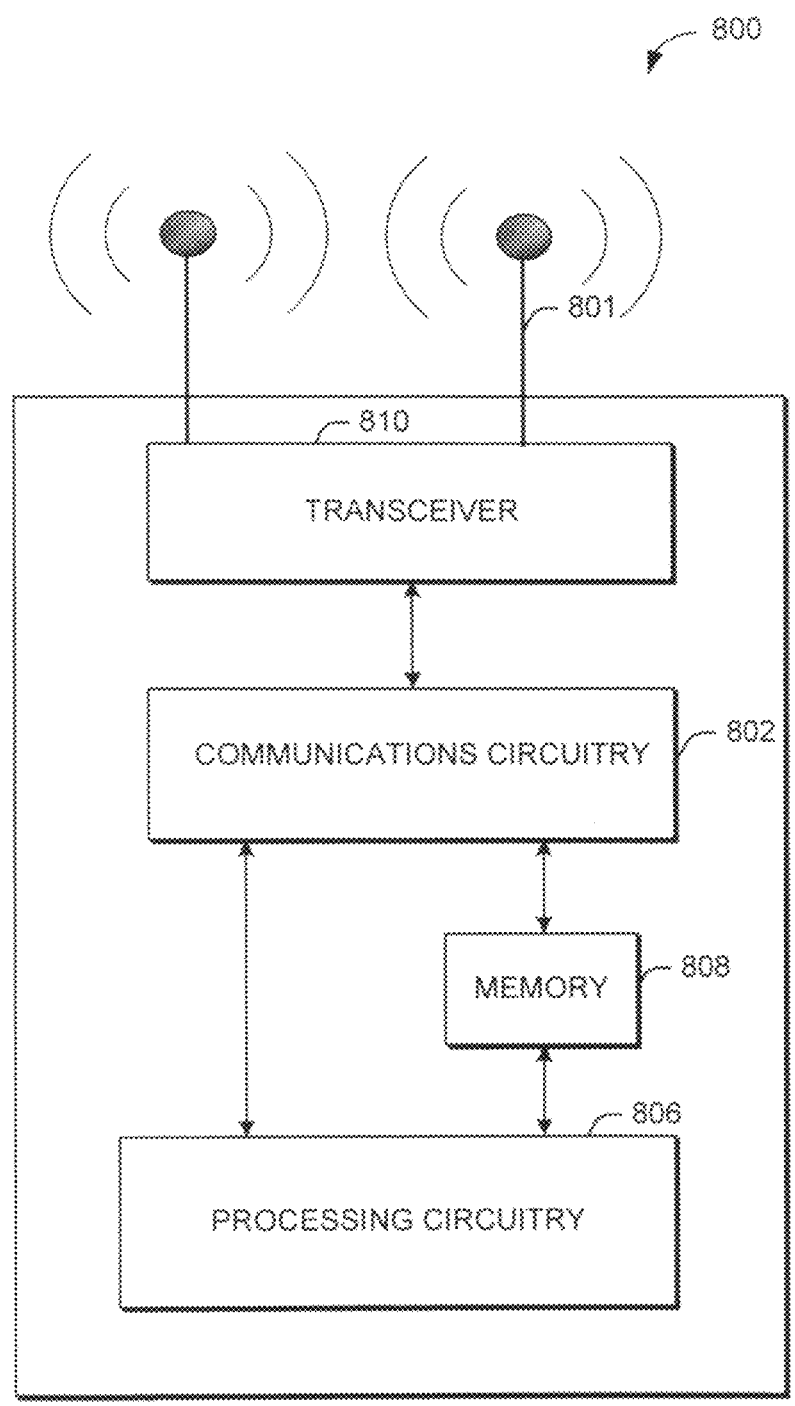
FIG. 8 illustrates a functional diagram of an example communication station that may be suitable for use as a user device, in accordance with one or more example embodiments of the disclosure.
Figure 9:
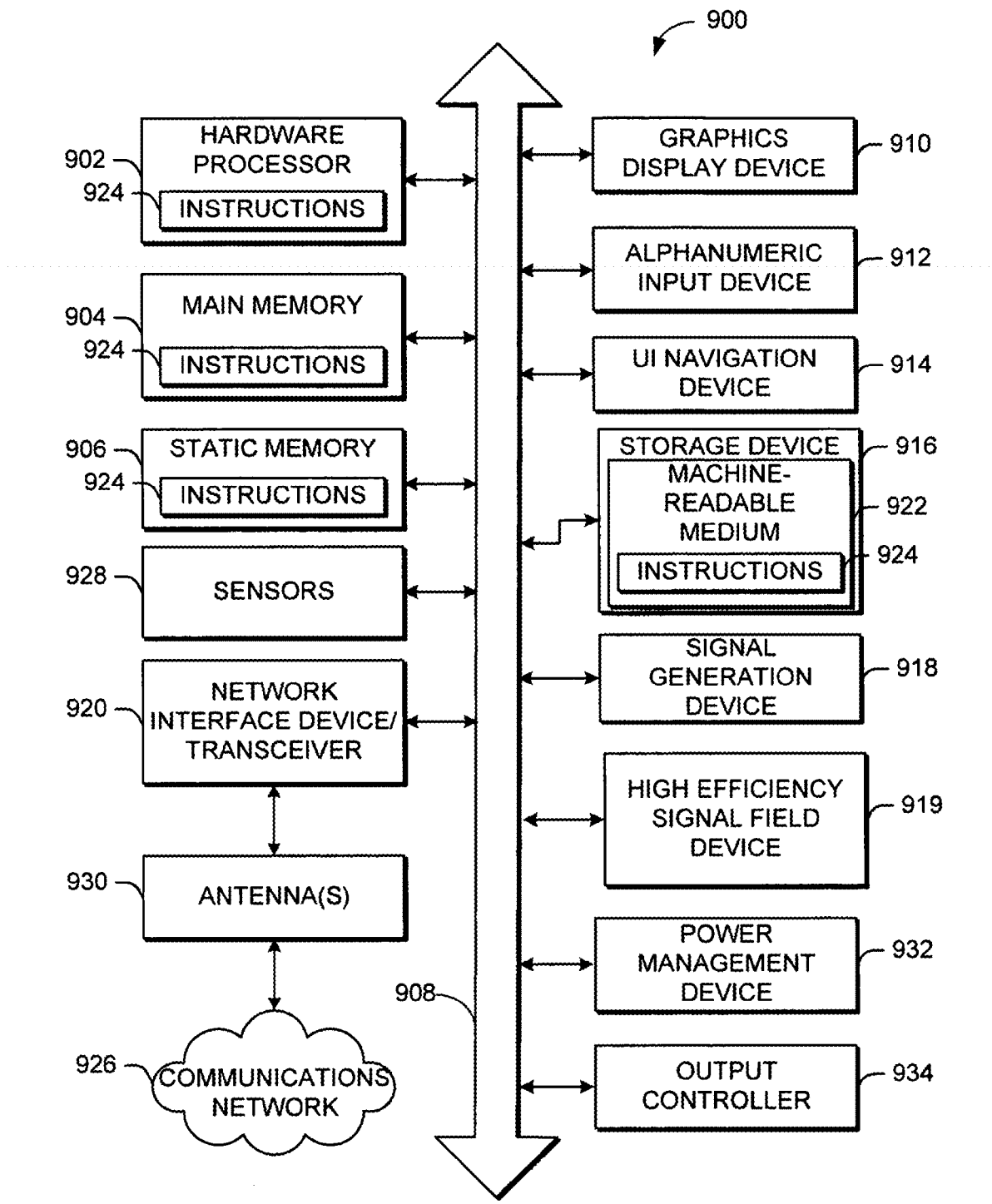
FIG. 9 is a block diagram of an example machine upon which any of one or more techniques (e.g., methods) may be performed, in accordance with one or more embodiments of the disclosure.

In some embodiments, the user devices 120 and AP 102 may include one or more computer systems similar to that of the functional diagram of FIG. 8 and/or the example machine/system of FIG. 9.

One or more illustrative user device(s) 120 may be operable by one or more user(s) 110. The user device(s) 120 (e.g., 124, 126, or 128) may include any suitable processor-driven user device including, but not limited to, a desktop user device, a laptop user device, a server, a router, a switch, an access point, a smartphone, a tablet, wearable wireless device (e.g., bracelet, watch, glasses, ring, etc.) and so forth.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultrahigh frequency communication mediums, satellite communication mediums, or any combination thereof.

Any of the user device(s) 120 (e.g., user devices 124, 126, 128), and the AP 102 may include one or more communications antennae. Communications antenna may be any suitable type of antenna corresponding to the communications protocols used by the user device(s) 120 (e.g., user devices 124, 126 and 128), and the AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When AP 102 establishes communication with one or more user devices 120 (e.g., user devices 124, 126, and/or 128), AP 102 may communicate in the downlink direction by sending data packets. The data packets may be preceded by one or more preambles that may be part of one or more headers. These preambles may be used to allow the user device to detect a new incoming data packet from the AP. A preamble may be a signal used in network communications to synchronize transmission timing between two or more devices (e.g., between the APs and user devices).

In one embodiment, and with reference to FIG. 1, an HEW preamble 140 may include one or more fields, such as, a legacy SIGNAL field (L-SIG), a repeated L-SIG (R-L-SIG), a high efficiency SIGNAL A (HE-SIG-A) field 141, a high efficiency SIGNAL B (HE-SIG-B) field 142 and/or any other fields representing OFDMA symbols. It is understood that the above acronyms may be different and not to be construed as a limitation as other acronyms may be used for the fields included in an HEW preamble. In preamble 140, the HE-SIG-B 142 comes after HE-SIG-A 141 such that the HE-SIG-A may be received by a user device before the HE-SIG-B field. HE-SIG-B 142 may contain resource allocation information for scheduled stations (e.g., user device(s) 120).

In one embodiment, the AP 102 may generate a HE-SIG-B field 142 that may be comprised of at least two portions: a common portion 144 and user device specific portion(s) 146. Further, common portion 144 may have two parts, a fixed length part, and a variable length part. The fixed length part may be for the ease of channel decoding and it may contain information about frequency bandwidth allocation. A frequency bandwidth allocation may be allocation of the resource in the frequency domain. After the first part is decoded after being received by one or more user devices 120, the length of the remaining parts of HE-SIG-B may be calculated for channel decoding such that the one or more user devices may be able to determine how to decode other fields that may be received. In some embodiments, the second part may contain information, such as spatial stream allocation for each of the allocated resource units (RUs). However, the spatial stream allocation may be provided in the user specific portion 146 of the HE-SIG-B field 142. Spatial stream allocation may be a technique for allocating spatial streams for transmissions in multiuser (MU) multiple-input multiple-output (MIMO) systems. In one embodiment, in order to reduce the overhead in the HEW preamble 140, the AP may allocate a zero number of streams to indicate to user devices whether there is an unallocated resource unit (RU) in frequency. On average, this may consume 5.5 bits for each unallocated RU as compared to the typical 17 bits using null or dummy association ID (AID) in user device specific part.

In one embodiment, the common part 144 of HE-SIG-B field 142 may be shared by all scheduled user devices 120. For example, the AP may generate the common part 144 to be sent to one or more user devices that may have scheduled resource units. In that case, it may not be necessary to generate this part of HE-SIG-B field 142 on a per user device basis. This commonality between the one or more user devices may result in overhead reduction. In some examples, the common part 144 may include a number of high efficiency long training field (HE-LTF) symbols, an RU allocation, and/or a spatial stream allocation. In other examples, the RU allocation or the spatial stream allocation may be included in the user device specific portion(s) 146. It is understood the above partitioning of the HE-SIG-B is an example and that other ways to partition the HE-SIG-B may be employed.

Figure 2:
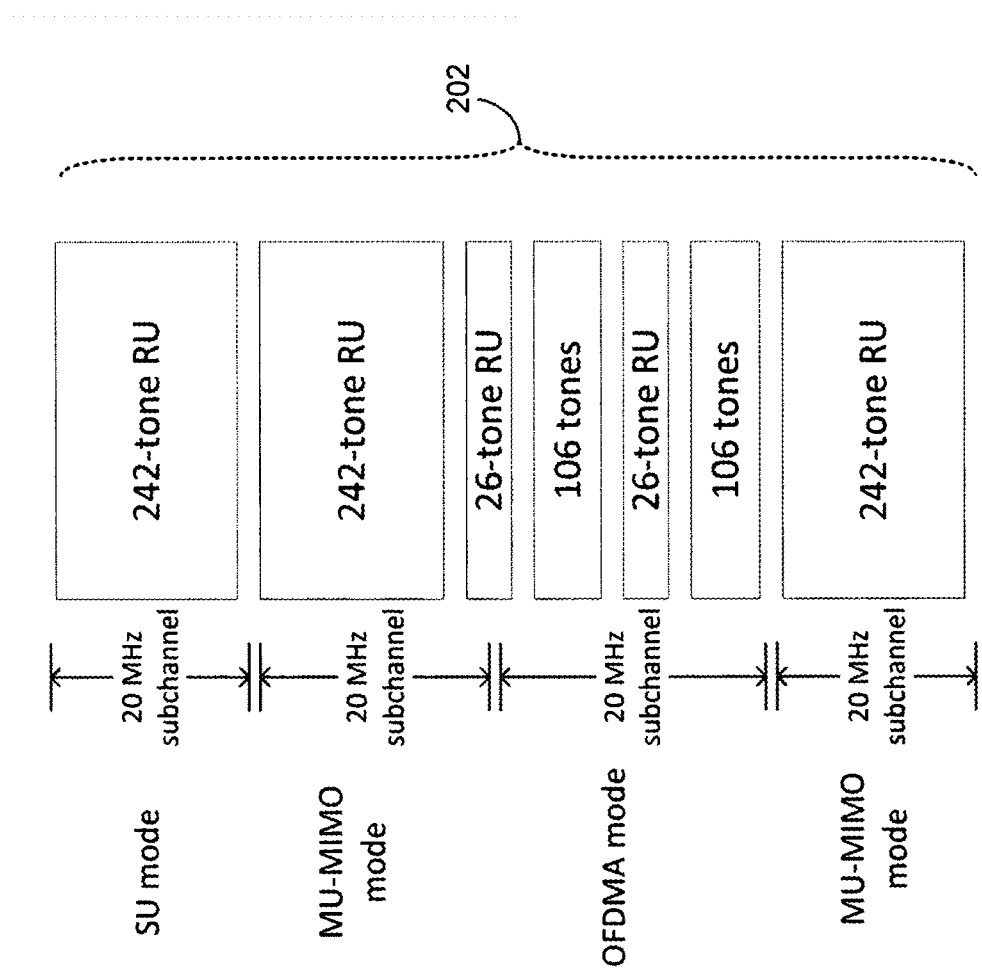
FIGS. 2 and 3 depict illustrative schematic diagrams of subchannel allocations and mixed modes.
Figure 3:
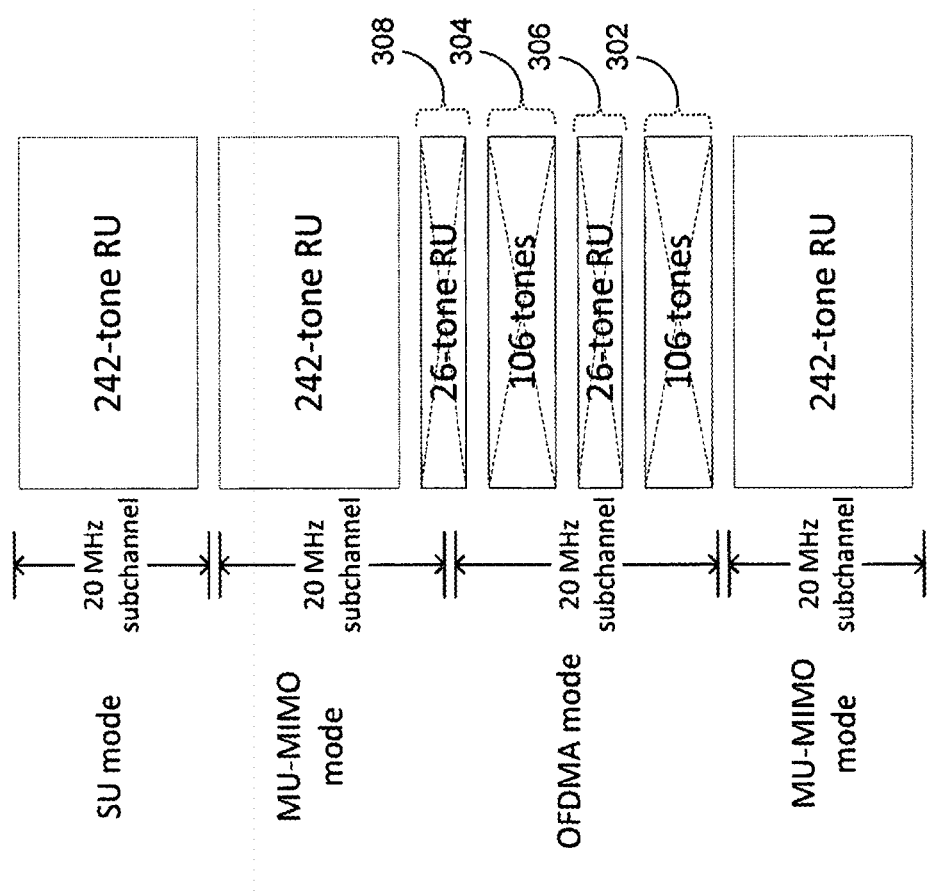

FIGS. 2 and 3 depict illustrative schematic diagram of subchannel allocations and mixed modes, in accordance with the one or more embodiments of the disclosure.

Referring to FIG. 2, the bandwidth for 802.11ax may be 80 MHz (e.g., bandwidth 202). The 80 MHz bandwidth 202 may be divided into 4 subchannels each having 20 MHz as illustrated in FIG. 2. There may be three basic modes: single user (SU), multiuser MIMO, (MU-MIMO), and OFDMA. In one burst of transmission, these three modes may share the frequency bandwidth in OFDMA fashion as illustrated in FIG. 2, this is referred to as mixed mode. Some frequency resource unit (RU) may be used by a single user (SU) mode. Some RU may be used by multiple users in MU-MIMO mode.

Referring to FIG. 3, in non-contiguous channel bonding mode, some 20 MHz subchannel may not be used such that the available subchannels may not be contiguous (e.g., subchannels 302 and 304). The RUs within or partially overlapping with the unavailable subchannel (e.g., RUs 306 and 308) may become unusable. In that case, available subchannels may be signaled before the HE-SIG-B field. For example, the available subchannels may be indicated in the HE-SIG-A or R-L-SIG. Therefore, before decoding HE-SIG-B 142, a user device may already know the total bandwidth (e.g., 20, 40, 80, or 160 MHz) and know which subchannels within the total bandwidth are available.

Figures 4A, 4B:
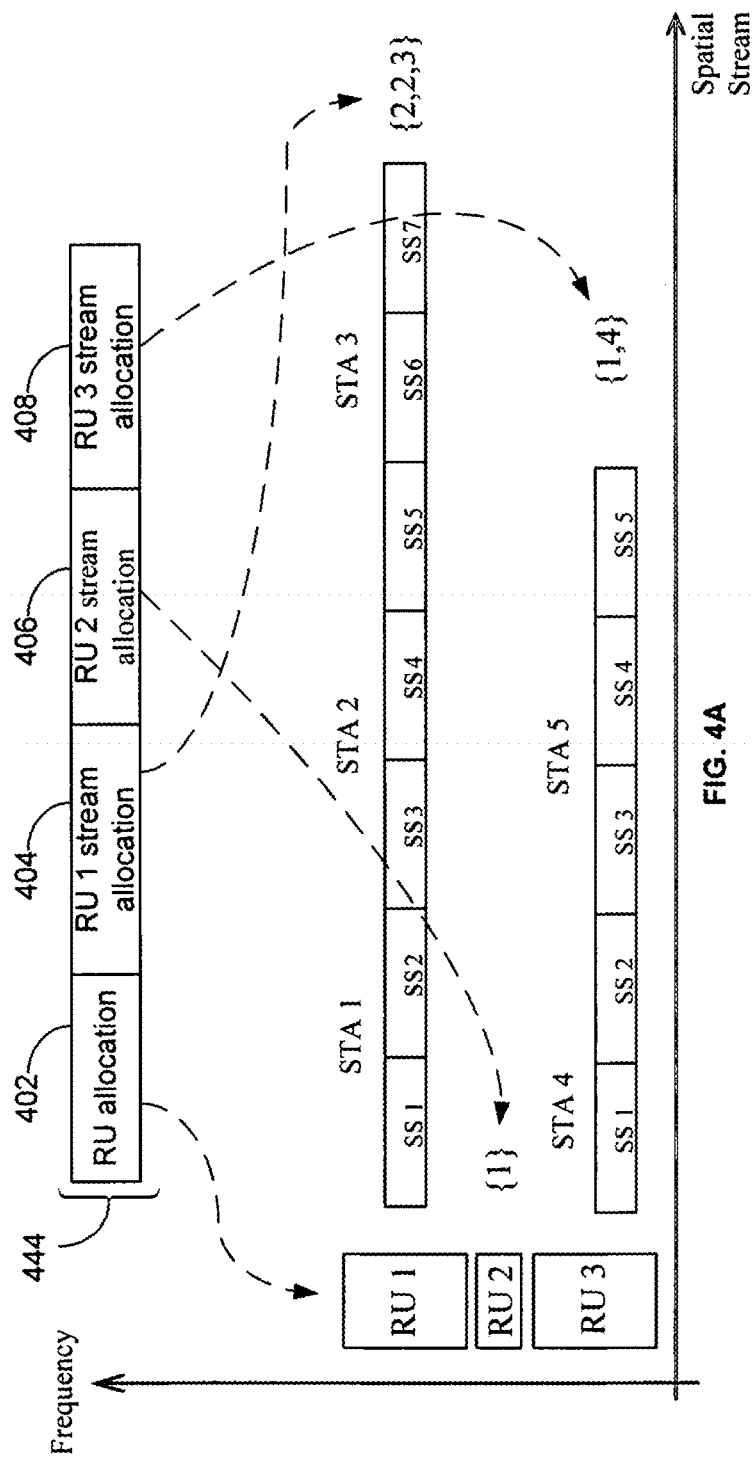
FIG. 4A depicts an illustrative high efficiency SIGNAL field, in accordance with the one or more embodiments of the disclosure.
FIG. 4B depicts an illustrative high efficiency SIGNAL field, in accordance with the one or more embodiments of the disclosure.

FIG. 4A depicts an illustrative high efficiency SIGNAL field, in accordance with the one or more embodiments of the disclosure.

In one embodiment, common part 444 of an HE-SIG-B field is illustrated in FIG. 4A. The frequency band may be partitioned based on the RU allocation 402. The RU allocation 402 may contain, at least in part, an index of bandwidth allocation pattern to be used by one or more user devices that may be serviced by an AP. The index may take about 5, 10, and 20 bits for contiguous 20, 40, and 80 MHz channels, respectively. In another embodiment, the index may take about 8, 17, and 37 bits for contiguous 20, 40, and 80 MHz channels, respectively. For non-contiguous channels in non-contiguous channel bonding, the numbers of required bits may be similar. The indexing for contiguous channel may be reused for non-contiguous channel. In this case, some 242-tone RU may be indicated as unavailable RU. Once the total bandwidth or the available subchannels are known from the HE-SIG-A or R-L-SIG fields, the number of bits in RU allocation 402 may be known. RU allocation 402 may be protected by a channel code word encoded separately from the rest of the spatial stream allocation part. Since the length of the RU allocation 402 may be known, a user device receiving the HE-SIG-B field may first decode this part so that the sizes and locations of all the available RUs in the band may be known. In the example of FIG. 4A, a contiguous 20 MHz channel may be used, which may be divided into a 106-tone RU, a 26-tone RU, and a 106-tone RU.

In some embodiments, following the RU allocation 402, spatial stream allocation for each available RU may be specified (e.g., stream allocations 404, 406 and 408). Although in this example, spatial stream allocation is shown to be provided in the common part of the HE-SIG-B field 444, spatial stream allocation may also be provided either in the user specific portions of the HE-SIG-B or in other fields. In the example of FIG. 4A, RU 1 with 106 tones is depicted to 7 spatial streams (e.g., spatial streams SS1-SS7). The 7 streams may be allocated to three user devices 120 (e.g., STA1, STA2 and STA3) such that STA1 has 2 spatial streams (e.g., spatial streams SS1 and SS2), STA2 having 2 spatial streams (e.g., spatial streams SS3 and SS4) and STA2 having three spatial streams (e.g., spatial streams SS5, SS6 and SS7). RU 2 with 26 tones may be unallocated, such that RU 2 may be indicated by stream set {0} meaning no stream is allocated. RU 3 with 106 tones may be allocated to two user devices (e.g., STA 4 and STA 5), where STA4 having 1 spatial stream (e.g., spatial streams SS1) and STA 5 having 4 spatial streams (e.g., spatial streams SS2, SS3, SS4 and SS5). In some scenarios, the number of high efficiency legacy training field (HE-LTF) symbols may be the same for all RUs. In that case, the number of HE-LTF symbols may be determined by the maximum stream number of all the RUs, which is 7 in this example. Further, the number of HE-LTF symbols may be selected from the feasible P-matrix sizes {1, 2, 4, 8} or {1, 2, 4, 6, 8}. Therefore, the number of HE-LTF symbols may be 8 for the example in FIG. 4A, which is the closest number greater than 7. Although the number of HE-LTF symbols may be specified explicitly (e.g., in HE-SIG-A, or common part of HE-SIG-B, or RU allocation 402 in FIG. 4A), by using the maximum number of the streams among all RUs, there may be no need to specify the number of HE-LTF symbols, which may result in a three bits saving in overhead.

In one embodiment, using a special index of stream allocation e.g. {0} for unallocated RU may reduce the overhead. Typically, it would have taken about 17 bits per unused RU. However, with one or more embodiments of the disclosure, this may take about 5.5 bits per unused RU on average. The zero stream allocation may also signal the unavailable subchannel. Therefore, by assigning a zero stream to the 242-tone RU, the AP may signal the unavailability of the corresponding 20 MHz subchannel using the tone plan for contiguous channel.

FIG. 4B depicts an illustrative high efficiency SIGNAL field, in accordance with the one or more embodiments of the disclosure.

In one embodiment, the number of unallocated RUs may determine the structure of a common part 446 of a HE-SIG-B field. Based on a predetermined threshold the structure of the HE-SIG-B common part may follow either the structure of common part 444 shown in FIG. 4A or the structure of common part 446 shown in FIG. 4B. It is understood that the predetermined threshold of unallocated RUs may be determined by the network, a system administrator, or other factors. For example, if there are only a few RUs (e.g. 1, 2, or 3) unallocated, the previous method using {0} stream indicator may be efficient. However, if there are many RUs unallocated, a one bit per RU may indicate whether the RU is allocated or not. A bit map for all the RUs may be placed after the RU allocation of FIG. 4A as shown in FIG. 4B. The length of the RU bit map can be determined by the RU allocation, more precisely the number of RUs in the indicated allocation pattern. Therefore, the RU allocation may be encoded separately with a known length. The RU bit map and the list of active RUs' stream allocations may be encoded and separated from the RU allocation. The RU bit map and the list of active RUs' stream allocations may be encoded together. Since the unallocated RUs are indicated by the RU bit map, only the stream allocations for the actually allocated RU may be in the list of active RU's stream allocations.

In one embodiment, the stream allocation indexes for single user (SU) and multi-user multiple input and multiple output (MU-MIMO) may have different lengths for reducing overhead. For example, a SU may only need 3-4 bits to indicate 0, 1, 2, . . . , 8 streams. MU-MIMO may need 4-7 bits to indicate all the possible stream allocation patterns for multiple user devices. For example, if the AP has 4 antennas, then 3 and 4 bits are enough for SU and MU, respectively. If the AP has 8 antennas, then 4 and 7 bits are enough for SU and MU, respectively. Without the unavailable RU (e.g., signaling {0}), 2-3 bits may be enough for SU. In one embodiment, it may be indicated whether single user or multiuser is used in each RU or subchannel in order to reduce the overhead. For SU mode like the OFDMA mode, where each RU may be used by one user device 120, 4 bits per RU may be enough. For multiuser mode like MU-MIMO, where each RU can be shared by multiple user devices in spatial multiplexing fashion, 7 bits per RU may be enough. For the example in FIG. 2, for each available subchannel, one bit may be used to indicate SU/MU mode. In an example embodiment, it may be assumed that the basic modes may not mix with each other within some bandwidth size (e.g., 20 MHz). For example, the indication bits may be (1, 0, 1, 0) or (0, 1, 0, 1) for the four subchannels. Since the middle 26-tone RU straddling two subchannels may be too small for MU-MIMO, it may belong to SU mode. The SU/MU indication may be located in RU allocation 402 of FIG. 4A i.e. the first portion of HE-SIG-B.

In an example embodiment, if there is no indication bits in RU allocation or the mixing of the basic modes can be for any RU size, the following may occur. Since only RUs with big enough sizes (e.g., 52 or 106 tones) may be used for MU-MIMO, a short index length may be used for the small RUs. For the example in FIG. 4A, the RU allocation for 20 MHz may take 5 bits. After the RU allocation pattern is specified by the bandwidth allocation index with 5 bits, the allocated RU sizes are known (e.g., 106-tone, 26-tone, and 106-tone). The two 106-tone RUs can be used for MU-MIMO or SU, and the 26-tone RU can only be used for SU. Therefore, the corresponding lengths for the three stream allocations are 7, 4, and 7 bits assuming the AP has 8 antennas. The total payload length of the stream allocations may be 18 bits in this example. Namely, MU-MIMO index format may be used for each big RU and SU format may be used for small RU. It should be noticed that MU-MIMO index may also allocate all the streams of the RU to a single user device 120. The stream allocations may be jointly protected by one channel code word separated from the RU allocation and the user device 120 specific parts. Since the length of stream allocation may go up to 100 bits for 80 MHz, ordinary convolutional code with tail bits may be used for enhancing the reliability. Since the length of RU allocation may not be more than 20 bits, tail biting convolutional code may be used. For overhead reduction, tail biting convolutional code may be used for the stream allocation when the payload size is less than a threshold (e.g., 30 bits) and ordinary convolutional code with tail bits may be used for payload size above the threshold.

In one embodiment, after decoding the RU allocation and stream allocations in the common part, the receiver may know how the frequency band is partitioned and how the many spatial streams are in each RU and how the streams are assigned to the user devices 120. The following user device specific parts of each scheduled user device further specify the remaining information such as station identifier (STAID), modulation and coding schemes (MCS), transmit beam-forming indication (TxBF), and frame extension parameter for each scheduled user device. Each user device's specific part may be encoded separately from each other by tail biting convolutional code or ordinary convolutional code. For the example in FIG. 4A, there are 5 specific parts for the 5 scheduled user devices (e.g., STA1, STA2, STA3, STA4 and STA5) since the middle 26-tone RU2 may not be allocated. It is understood that TxBF indicates whether the channel is beamformed or not. If it is beamformed, the receiver may choose not to conduct channel smoothing on the channel estimates. It is understood that frame extension parameter may be a 2-bit indicator. It may be for extending the packet transmission time. It may add a dummy signal at the end of the useful packet and it may allow the user device to have a longer time to decode the received packet, more precisely.

Figure 5:
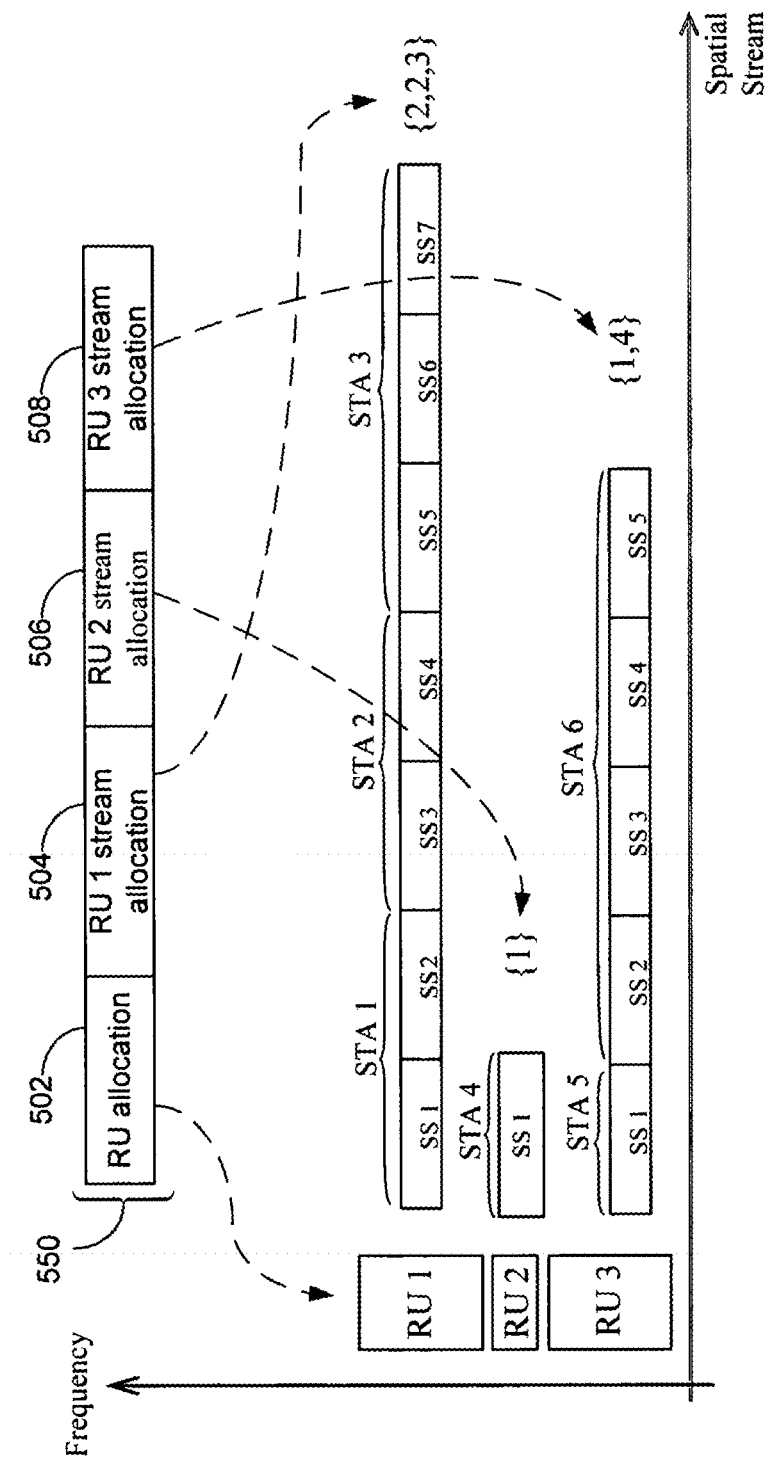
FIG. 5 depicts an illustrative high efficiency SIGNAL field, in accordance with the one or more embodiments of the disclosure.

FIG. 5 depicts an illustrative high efficiency SIGNAL field in a mixed mode of single and multiple user devices, in accordance with the one or more embodiments of the disclosure.

In the example for FIG. 5, there may be six user devices that may be served by an AP. Some of the user devices may follow a multiple user mode or a single user mode. In this example, the middle 26-tone RU 2 may be allocated to a single user device (e.g., STA 4), while RU 1 and RU 3 are allocated for multiple user devices (e.g., STA1, STA2, STA3, STA5 and STA6). There may be one common part of an HE-SIG-B field that may be used for these user devices and there may be six specific parts for the six scheduled user devices.

In one embodiment, common part 550 of an HE-SIG-B field is illustrated in FIG. 5. The frequency band may be partitioned based on the RU allocation 502. For example, an AP may partition the frequency band may into three sub-bands, 8 MHz, 2 MHz, and 8 MHz. The RU allocation 502 may contain, at least in part, an index of bandwidth allocation pattern to be used by one or more user devices that may be serviced by the AP. The index may take about 5, 10, and 20 bits for contiguous 20, 40, and 80 MHz channels, respectively. For non-contiguous channels in non-contiguous channel bonding, the numbers of required bits may be similar. The indexing for contiguous channel may be reused for non-contiguous channel. In this case, some 242-tone RU may be indicated as unavailable RU. Once the total bandwidth or the available subchannels are known from the HE-SIG-A or R-L-SIG fields, the number of bits in RU allocation 402 may be known. RU allocation 502 may be protected by a channel code word encoded separately from the rest of the HE-SIG-B. Since the length of the RU allocation 502 may be known, a user device receiving the HE-SIG-B field may first decode this part so that the sizes and locations of all the available RUs in the band may be known. In the example of FIG. 5, a contiguous 20 MHz channel may be used, which may be divided into a 106-tone RU, a 26-tone RU, and a 106-tone RU.

In some embodiments, following the RU allocation 502, spatial stream allocation for each available RU may be specified by the AP (e.g., stream allocations 504, 506 and 508). Although in this example, spatial stream allocation is shown to be provided in the common part of the HE-SIG-B field 550, spatial stream allocation may also be provided either in the user specific portions of the HE-SIG-B field or in other fields. In the example of FIG. 5, RU 1 with 106 tones is depicted to 7 spatial streams (e.g., spatial streams SS1-SS7). The 7 streams may be allocated to three user devices 120 (e.g., STA1, STA2 and STA3) such that STA1 has 2 spatial streams (e.g., spatial streams SS1 and SS2), STA2 having 2 spatial streams (e.g., spatial streams SS3 and SS4) and STA3 having three spatial streams (e.g., spatial streams SS5, SS6 and SS7). RU 2 with 26 tones may be allocated to one user device STA4 with one spatial stream (e.g., spatial stream SS1). RU 3 with 106 tones may be allocated to two user devices (e.g., STA5 and STA6), where STA5 having 1 spatial stream (e.g., spatial streams SS1) and STA6 having 4 spatial streams (e.g., spatial streams SS2, SS3, SS4 and SS5).

Figure 6:
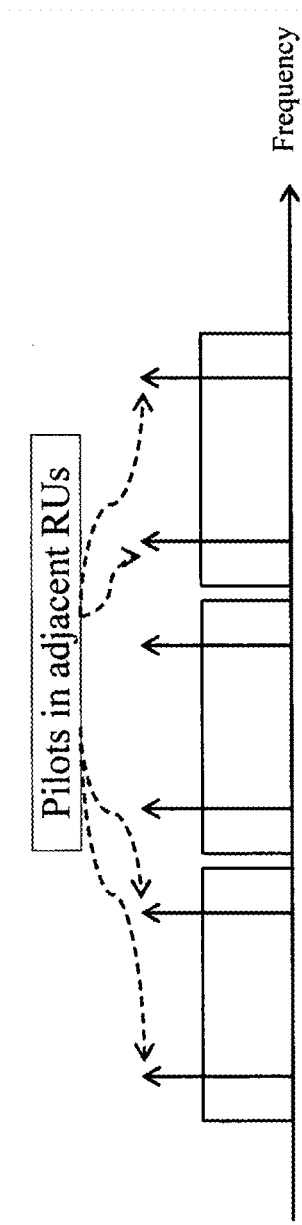
FIG. 6 depicts an illustrative diagram of pilot signals in adjacent resource units, in accordance with the one or more embodiments of the disclosure.

FIG. 6 depicts an illustrative diagram of pilot signals in adjacent resource units, in accordance with the one or more embodiments of the disclosure.

In one embodiment, having resource allocation information in the common part on an HE-SIG-B field may help in various ways, such as overhead reduction, enhancing the reception of data, and interference reduction. A user device that may be scheduled to transmit data may know the pilot signals location and structure in other RUs, based on decoding the one or more parts of the HE-SIG-B field. Pilot signals are inserted between other signals for channel estimation, to track channel variations and for synchronization between, for example, an AP and a user device. The reason is that the pilot signals location and structure may be determined by the RU location and size, and the stream number on the RU. Finally, knowing the other streams in the same MU-MIMO RU, the receiver may enhance the multiuser interference mitigation by minimum mean-square error (MMSE) filtering and successive interference cancellation (SIC).

Figure 7A:
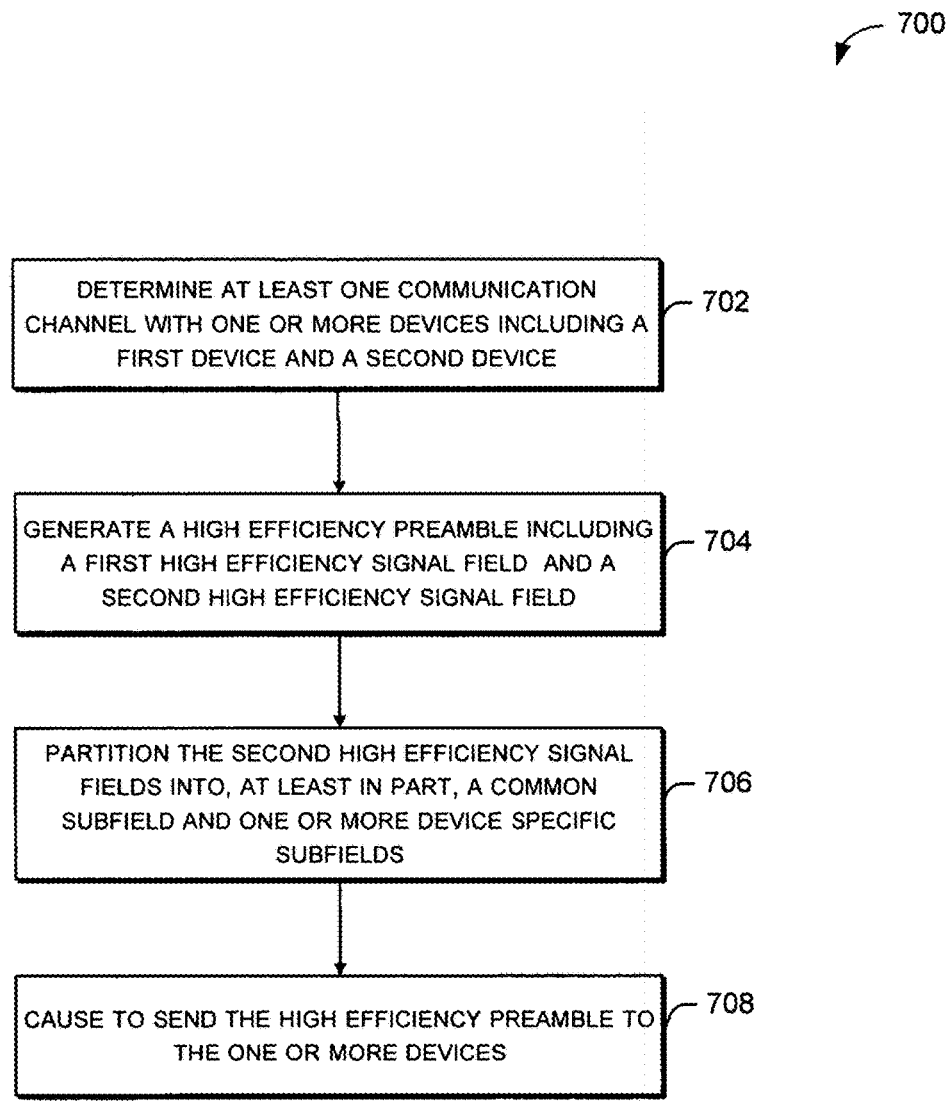
FIG. 7A depicts a flow diagram of an illustrative process for an illustrative high efficiency SIGNAL field architecture, in accordance with one or more embodiments of the disclosure.

FIG. 7A depicts a flow diagram of an illustrative process 700 for an illustrative high efficiency SIGNAL field architecture, in accordance with one or more embodiments of the disclosure.

At block 702, an AP 102 may determine at least one communication channel with one or more user devices. For example, AP 102 may determine a communication channel with various user devices that it may service. The high efficiency communication standard may be an IEEE 802.11ax (HEW) communication standard.

At block 704, the AP 102 may generate a high efficiency preamble in accordance with a high efficiency communication standard, the high efficiency preamble may include one or more high efficiency SIGNAL fields. The high efficiency SIGNAL fields may include one or more HE-SIG-A field and/or one or more HE-SIG-B fields.

At block 706, the AP 102 may partition at least one of the HE-SIG-B fields into a common subfield and one or more device specific subfields. The common subfield may be common to one or more devices that AP 102 may service. The common subfield may include at least resource allocation information that may be common to all user devices that AP 102 may service. In some embodiments, the common subfield may include spatial stream allocations, and/or legacy training fields (LTFs). In other embodiment, the spatial stream allocations may be included in the one or more device specific subfields. The one or more device specific subfields may include at least one of station identifier (STAID), modulation and coding scheme (MCS), transmit beamforming indication (TxBF), or frame extension parameter associated with the first computing device. The one or more device specific subfields may be encoded by at least one of tail biting convolutional code or ordinary convolutional code. A convolutional code is a type of error-correcting code.

At block 708, the AP 102 may send the high efficiency preamble to the one or more user devices. When the one or more devices receive the high efficiency preamble, they may decode the various high efficiency fields. For example, a user device may decode the common part of the HE-SIG-B field and determine channel information such as resource allocation and/or spatial stream allocation for each of the allocated resource units (RUs). This information may also be included in the device specific subfields. For example, the user device may determine from decoding the device specific subfields which spatial streams are used and which are not.

Figure 7B:
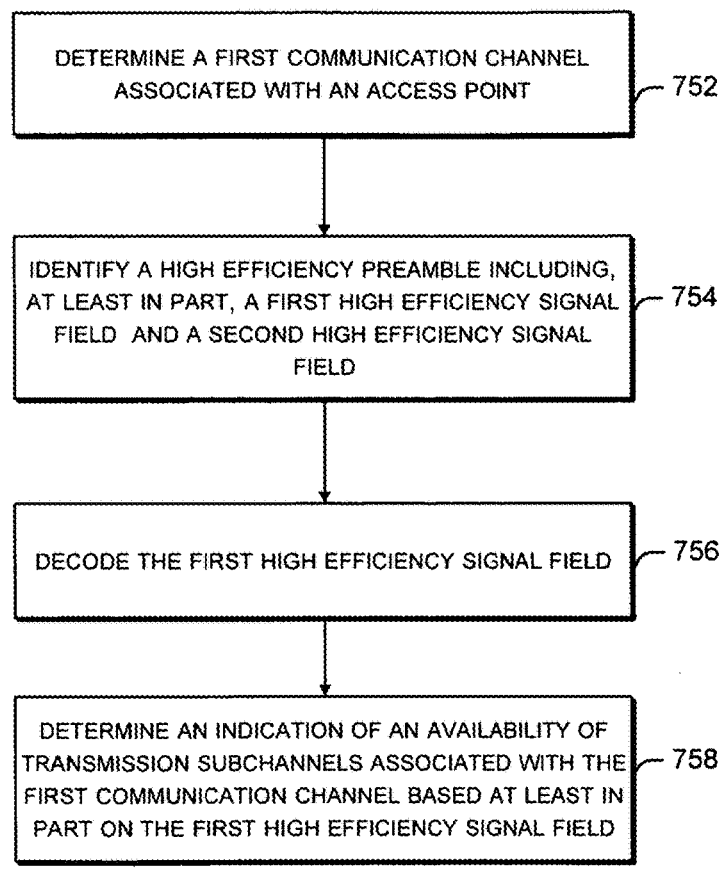
FIG. 7B depicts a flow diagram of an illustrative process for an illustrative high efficiency SIGNAL field architecture, in accordance with one or more embodiments of the disclosure.

FIG. 7B depicts a flow diagram of an illustrative process 750 for an illustrative high efficiency SIGNAL field architecture, in accordance with one or more embodiments of the disclosure.

At block 752, a user device may determine a first communication channel associated with an AP. The communication channel may be established between the user device and the AP in order to transmit and receive date.

At block 754, a user device may identify a high efficiency preamble in accordance with a high efficiency communication standard. For example, when the AP sends the high efficiency preamble, the user device may determine that the high efficiency preamble is in accordance with, for example, an IEEE 802.11ax (HEW) communication standard. In that case, the user device may be able to decode the one or more fields that may be included in the high efficiency preamble based on the determined communication standard. In the case of HEW, the high efficiency preamble may include one or more HE-SIG-A and/or HE-SIG-B fields.

At block 756, a user device may decode the HE-SIG-A field. When the user device determines that an HE-SIG-A field was received, the user device may decode that field in order to retrieve information that may be beneficial for decoding other fields. For example, the HE-SIG-B field may be received after the HE-SIG-A field has been received by the user device. Therefore, information that may be useful when decoding the HE-SIG-B field, may be included in the HE-SIG-A field.

At block 758, a user device may determine an indication of an availability of transmission subchannels associated with the communication channel based at least in part on the HE-SIG-A field. Further, the HE-SIG-A may also contain an indication of the total bandwidth of the communication channel. The bandwidth and/or the available subchannels may be known by the user device from decoding the HE-SIG-A (or other fields). Although the bandwidth and/or the available subchannels may be contained in the HE-SIG-A field, other fields may contain that information.

In some embodiments, the user device may determine that the HE-SIG-B field may contain a common subfield and one or more device specific subfields included. The common subfield may be common to one or more user devices. The common subfield may include at least one of a resource allocation, a spatial stream allocation, or a number of legacy training fields (LTF). The one or more device specific subfields may include at least one of station identifier (STAID), modulation and coding scheme (MCS), transmit beamforming indication (TxBF), or frame extension parameter associated with the first computing device. Although it is shown that spatial stream allocation is included in the common subfield of the HE-SIG-B, in some embodiments, the spatial stream allocation may be included in at least one of the one or more device specific subfields.

FIG. 8 shows a functional diagram of an exemplary communication station 800 in accordance with some embodiments. In one embodiment, FIG. 8 illustrates a functional block diagram of a communication station that may be suitable for use as an AP 102 (FIG. 1) or a user device 120 (FIG. 1) in accordance with some embodiments. The communication station 800 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 800 may include communications circuitry 802 and a transceiver 810 for transmitting and receiving signals to and from other communication stations using one or more antennas 801. The communications circuitry 802 may include circuitry that can operate the physical layer communications and/or medium access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform the operations detailed in FIGS. 2, 3, 4A, 4B, 5 and 6.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device may, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device memory.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), a high efficiency SIGNAL field device 919, a network interface device/transceiver 920 coupled to antenna(s) 930, and one or more sensors 928, such as a global positioning system (GPS) sensor, compass, accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The high efficiency SIGNAL field device 919 may be carry out or perform any of the operations and processes (e.g., processes 700 and 750) described and shown above.

For example, the high efficiency SIGNAL field device 919 may be configured to generate a HE-SIG-B that may be comprised of at least two portions: a common portion and user device specific portion(s). The common portion may have two parts, a fixed length part, and a variable length part. The fixed length part may be for the ease of channel decoding and it may contain information about frequency bandwidth allocation. After the first part is decoded, the length of the second part can be calculated for channel decoding. The second part may contain information about spatial stream allocation for each of the allocated resource units (RUs). For reducing overhead, the '0' number of streams may be used to indicate an unallocated resource unit (RU) in frequency. On average, this may consume 5.5 bits for each unallocated RU as compared to the typical 17 bits using null or dummy association ID (AID) in user device specific part. Thus resulting in reduced overhead.

The high efficiency SIGNAL field device 919 may be configured to share the common part of HE-SIG-B by all scheduled user devices, and it may not be necessary to repeat this part in each user device's specific part, resulting in overhead reduction. For minimizing the overhead, the number of HE-LTF symbols, RU allocation, and stream allocation may be included in the common part.

While the machine-readable medium 922 is illustrated as a single medium, the term "machine-readable medium" may include a single medium or multiple media (e.g., a centralized or distributed database, and/or associated caches and servers) configured to store the one or more instructions 924.

Certain embodiments may be implemented in one or a combination of hardware; firmware, and software. Other embodiments may also be implemented as instructions stored on a computer-readable storage device, which may be read and executed by at least one processor to perform the operations described herein. The instructions may be in any suitable form, such as but not limited to source code, compiled code, interpreted code, executable code, static code, dynamic code, and the like. A computer-readable storage device or medium may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 900 may include one or more processors and may be configured with instructions stored on a computer-readable storage device memory.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software. The operations and processes (e.g., processes 700 and 750) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

In example embodiments of the disclosure, there may be a device. The device may include at least one memory that stores computer-executable instructions; and at least one processor of the one or more processors configured to access the at least one memory, wherein the at least one processor of the one or more processors may be configured to execute the computer-executable instructions to determine at least one communication channel with one or more devices including a first device and a second device; generate a high efficiency preamble in accordance with a high efficiency communication standard, the high efficiency preamble including, at least in part, a first high efficiency SIGNAL field and a second high efficiency SIGNAL field; partition the second high efficiency SIGNAL fields into, at least in part, a common subfield and one or more device specific subfields; encode, into the first high efficiency SIGNAL field, a length of at least one of the one or more device specific subfields; and encode, into the first high efficiency SIGNAL field, an indication of an availability of transmission subchannels associated with the at least one communication channel.

Implementations may include one or more of the following features. The common subfield is common to the first device and the second device. The common subfield may include at least one of a resource allocation, a spatial stream allocation, or a number of legacy training fields (LTF). The high efficiency communication standard is an institute of electrical and electronics engineers (IEEE) 802.11 ax communication standard. The device specific subfield includes at least one of station identifier (STAID), modulation and coding scheme (MCS), transmit beamforming indication (TxBF), or frame extension parameter associated with the first computing device. The first high efficiency SIGNAL field may include a high efficiency SIGNAL A (HE-SIG-A) field. The second high efficiency SIGNAL field may include a high efficiency SIGNAL B (HE-SIG-B) field. The device specific subfield may be encoded by at least one of tail biting convolutional code or ordinary convolutional code. The device may further include a transceiver configured to transmit and receive wireless signals; an antenna coupled to the transceiver. The device may also include one or more processors in communication with the transceiver.

In example embodiments of the disclosure, there may be a non-transitory computer-readable medium. The non-transitory computer-readable medium may store computer-executable instructions which, when executed by a processor, cause the processor to perform operations comprising: identifying a first communication channel with an access point; identifying a high efficiency preamble in accordance with a high efficiency communication standard, the high efficiency preamble including, at least in part, a first high efficiency SIGNAL field and a second high efficiency SIGNAL field; decoding the first high efficiency SIGNAL field; determining an indication of an availability of transmission subchannels associated with the first communication channel based at least in part on the first high efficiency SIGNAL field.

Implementations may include one or more of the following features. The computer-executable instructions may cause the processor to further perform operations including determining a common subfield and one or more device specific subfields included in the second high efficiency SIGNAL field. The computer-executable instructions may cause the processor to further perform operations including determining a length of one of the one or more device specific subfields based at least in part on decoding the first high efficiency SIGNAL field. The common subfield may be common to one or more devices. The common subfield may include at least one of a resource allocation, a spatial stream allocation, or a number of legacy training fields (LTF). The device specific subfield includes at least one of station identifier (STAID), modulation and coding scheme (MCS), transmit beamforming indication (TxBF), or frame extension parameter associated with the first computing device. The device specific subfield may be encoded by at least one of tail biting convolutional code or ordinary convolutional code. The first high efficiency SIGNAL field may include a high efficiency SIGNAL A (HE-SIG-A) field. The second high efficiency SIGNAL field may include a high efficiency SIGNAL B (HE-SIG-B) field.

In example embodiments of the disclosure, there may be a method. The method may include determining at least one communication channel with one or more devices including a first device and a second device. The method may include generating a high efficiency preamble in accordance with a high efficiency communication standard, the high efficiency preamble including, at least in part, a first high efficiency SIGNAL field and a second high efficiency SIGNAL field. The method may include partitioning the second high efficiency SIGNAL fields into, at least in part, a common subfield, and one or more device specific subfields. The method may include encoding, into the first high efficiency SIGNAL field, a length of at least one of the one or more device specific subfields. The method may include encoding, into the first high efficiency SIGNAL field, an indication of an availability of transmission subchannels associated with the at least one communication channel. Implementations may include one or more of the following features. The common subfield is common to the first device and the second device. The common subfield includes at least one of a resource allocation, a spatial stream allocation, or a number of legacy training fields (LTF).

In example embodiments of the disclosure, there may be an apparatus. The apparatus may include means for determining at least one communication channel with one or more devices including a first device and a second device. The apparatus may include means for generating a high efficiency preamble in accordance with a high efficiency communication standard, the high efficiency preamble including, at least in part, a first high efficiency SIGNAL field and a second high efficiency SIGNAL field. The apparatus may include means for partitioning the second high efficiency SIGNAL fields into, at least in part, a common subfield, and one or more device specific subfields. The apparatus may include means for causing to send the high efficiency preamble to at least one of the one or more devices.

Implementations may include one or more of the following features. The common subfield is common to the first device and the second device. The common subfield includes at least one of a resource allocation, a spatial stream allocation, or a number of legacy training fields (LTF). The high efficiency communication standard is an Institute of Electrical and Electronics Engineers (IEEE) 802.11 ax communication standard. The device specific subfield includes at least one of station identifier (STAID), modulation and coding scheme (MCS), transmit beamforming indication (TxBF), or frame extension parameter associated with the first computing device. The first high efficiency SIGNAL field includes a high efficiency SIGNAL A (HE-SIG-A) field. The second high efficiency SIGNAL field includes a high efficiency SIGNAL B (HE-SIG-B) field.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
   at least one memory that stores computer-executable instructions; and
   at least one processor configured to access the at least one memory, wherein the at least one processor of the one or more processors is configured to execute the computer-executable instructions to:
   determine at least one communication channel with one or more station devices including a first station device and a second station device;
   generate a high efficiency preamble in accordance with a high efficiency communication standard, the high efficiency preamble including, at least in part, a first high efficiency SIGNAL field and a second high efficiency SIGNAL field;
   partition the second high efficiency SIGNAL field into a common subfield and one or more device specific subfields, wherein the common subfield includes one or more of a resource allocation, a spatial stream allocation, or a number of legacy training fields (LTF);
   determine to allocate a predetermined number of streams in the high efficiency preamble to indicate, to the one or more station devices, one or more resource units that are not allocated; and
   cause to send the high efficiency preamble to at least one of the one or more station devices.

2. The device of claim 1, wherein the common subfield is common to the first station device and the second station device.

3. The device of claim 1, wherein the high efficiency communication standard is an Institute of Electrical and Electronics Engineers (IEEE) 802.11 ax communication standard.

4. The device of claim 1, wherein at least one of the one or more device specific subfields includes at least one of station identifier (STAID), a modulation and coding scheme (MCS), a transmit beamforming indication (TxBF), and a frame extension parameter associated with the first station device.

5. The device of claim 1, wherein the first high efficiency SIGNAL field includes a high efficiency SIGNAL A (HE-SIG-A) field.

6. The device of claim 1, wherein the second high efficiency SIGNAL field includes a high efficiency SIGNAL B (HE-SIG-B) field.

7. The device of claim 1, further comprising a transceiver configured to transmit and receive wireless signals.

8. The device of claim 7, further comprising one or more antennas coupled to the transceiver.

9. A non-transitory computer-readable medium storing computer-executable instructions which, when executed by a processor, cause the processor to perform operations comprising:
   determining a first communication channel associated with an access point;
   identifying a high efficiency preamble in accordance with a high efficiency communication standard, the high efficiency preamble including, at least in part, a first high efficiency SIGNAL field and a second high efficiency SIGNAL field;
   decoding the first high efficiency SIGNAL field;
   determining a common subfield and one or more device specific subfields included in the second high efficiency SIGNAL field, wherein the common subfield includes one or more of a resource allocation, a spatial stream allocation, or a number of legacy training fields (LTF);

identifying a predetermined number of streams in the high efficiency preamble indicating one or more resource units that are not allocated; and determining an indication of an availability of transmission subchannels associated with the first communication channel based on the first high efficiency SIGNAL field.

10. The non-transitory computer-readable medium of claim 9, wherein the computer-executable instructions cause the processor to further perform operations comprising:

determining a length of one of the one or more device specific subfields based on decoding the first high efficiency SIGNAL field.

11. The non-transitory computer-readable medium of claim 9, wherein the common subfield is common to one or more devices.

12. The non-transitory computer-readable medium of claim 9, wherein the one or more device specific subfields includes at least one of a station identifier (STAID), a modulation and coding schemes (MCS), a transmit beamforming indication (TxBF), and a frame extension parameter associated with a first station device.

13. The non-transitory computer-readable medium of claim 9, wherein the first high efficiency SIGNAL field includes a high efficiency SIGNAL A (HE-SIG-A) field.

14. The non-transitory computer-readable medium of claim 9, wherein the second high efficiency SIGNAL field includes a high efficiency SIGNAL B (HE-SIG-B) field.

15. The non-transitory computer-readable medium of claim 9, wherein the one or more device specific subfield may be encoded by a tail biting convolutional code or an ordinary convolutional code.

16. A method comprising:

determining at least one communication channel with one or more devices including a first device and a second device;

generating a high efficiency preamble in accordance with a high efficiency communication standard, the high efficiency preamble including, at least in part, a first high efficiency SIGNAL field and a second high efficiency SIGNAL field;

partitioning the second high efficiency SIGNAL field into a common subfield and one or more device specific subfields, wherein the common subfield includes one or more of a resource allocation, a spatial stream allocation, and a number of legacy training fields (LTF);

determining to allocate a predetermined number of streams in the high efficiency preamble to indicate, to the one or more devices, one or more resource units that are not allocated; and causing to send the high efficiency preamble to at least one of the one or more devices.

17. The method of claim 16, wherein the common subfield is common to the first device and the second device.

* * * * *